H. A. TUTTLE.
ACTUATING MECHANISM FOR REVERSING GEARING.
APPLICATION FILED AUG. 3, 1912.

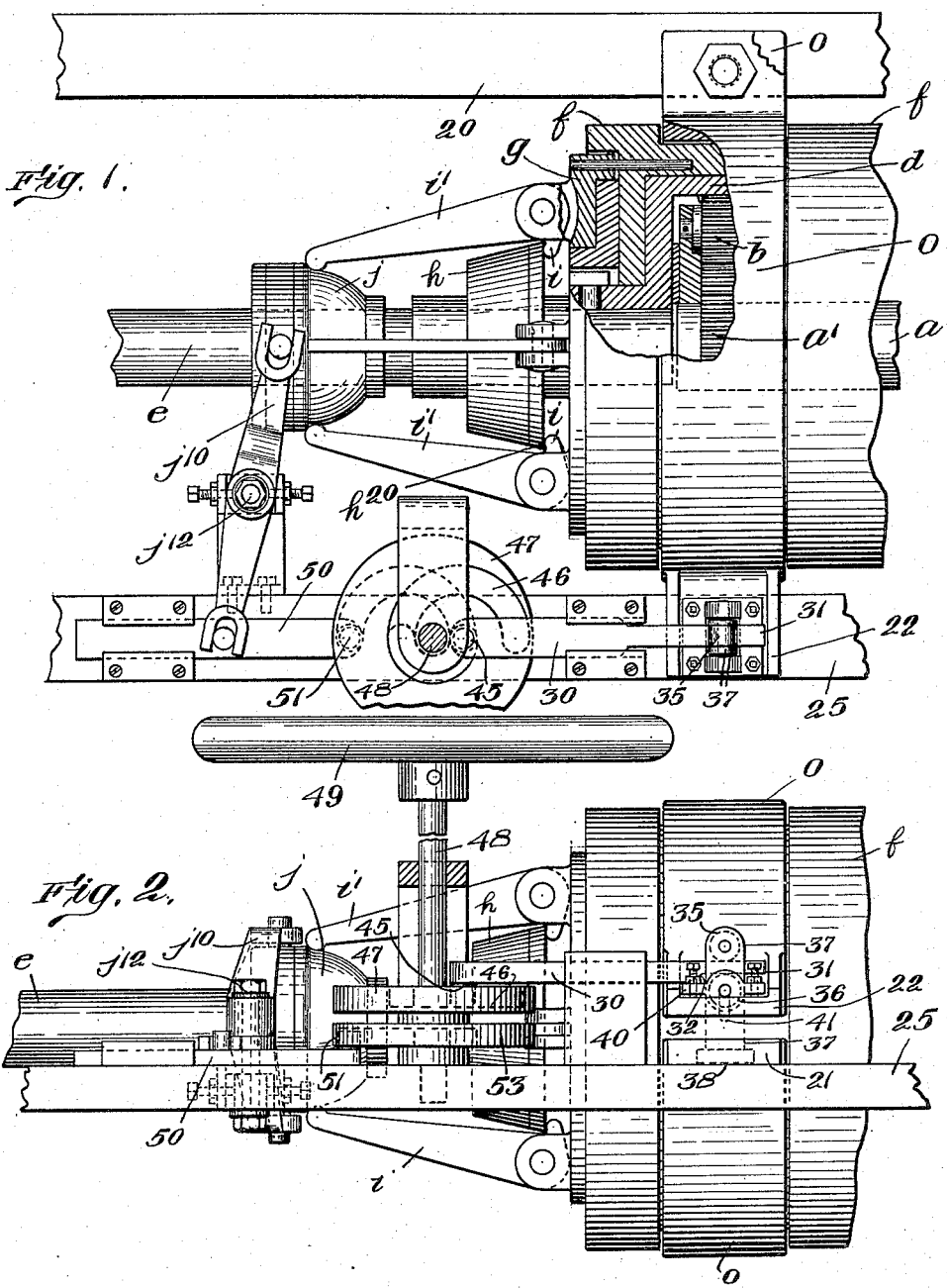

1,168,765.

Patented Jan. 18, 1916.
2 SHEETS—SHEET 2.

Witnesses;
H. B. Davis.
C. Doyle.

Inventor;
Henry A. Tuttle
by Bayes & Harrison
attys.

UNITED STATES PATENT OFFICE.

HENRY A. TUTTLE, OF TAUNTON, MASSACHUSETTS.

ACTUATING MECHANISM FOR REVERSING-GEARING.

1,168,765.

Specification of Letters Patent.

Patented Jan. 18, 1916.

Application filed August 3, 1912. Serial No. 713,020.

*To all whom it may concern:*

Be it known that I, HENRY A. TUTTLE, a citizen of the United States, residing at Taunton, in the county of Bristol and State of Massachusetts, have invened an Improvement in Actuating Mechanism for Reversing-Gearing, of which he following is a specification.

In reversing-gearing, such for instance as shown in patent granted to me October 20, 1908, #901,664, a clutch and a brake are involved, the clutch operating to connect the pinion-carrier with one of the shafts whereby the driven-shaft is rotated forward by and in the same direction as the driving-shaft, and the brake operating to engage the pinion-carrier and hold it at rest whereby the driven-shaft is rotated backward by and in a direction opposite to the driving-shaft, and an actuating-lever is provided by which the clutch and brake are operated. Said actuating-lever is pivotally supported, and is connected with both the clutch and the brake, and, upon movement of it in opposite directions said clutch and brake are operated, respectively, but during its movement to operate either, the other is moved unnecessarily, which has been found to be objectionable. Furthermore, said actuating-lever requires considerable space in which to move, which is also objectionable.

This invention has for its object the provision of improved actuating - mechanism for the clutch and brake of reversing-gearing, whereby either is held at rest while the other is operated; and which occupies less space than the actuating-lever of the patent aforesaid.

Figure 3:
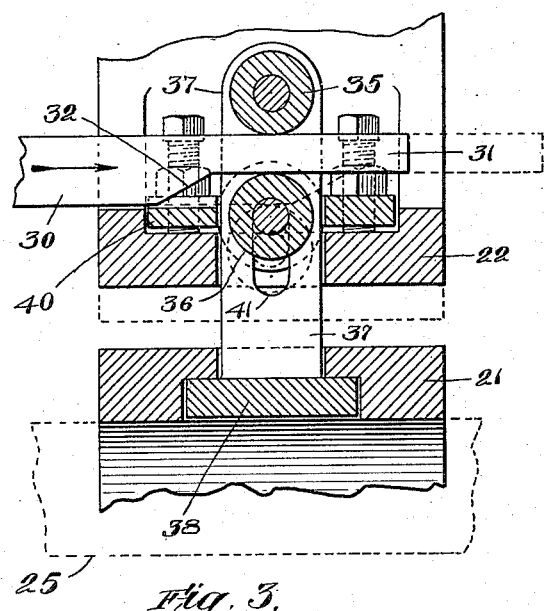
Figure 5:
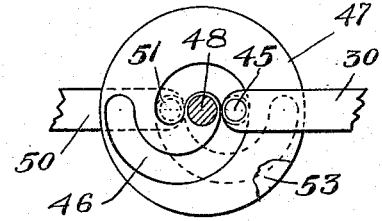
Figure 6:
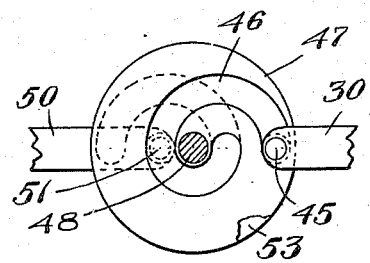
Figure 4:
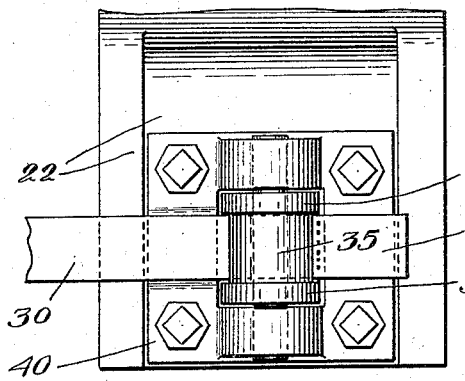
Figure 7:
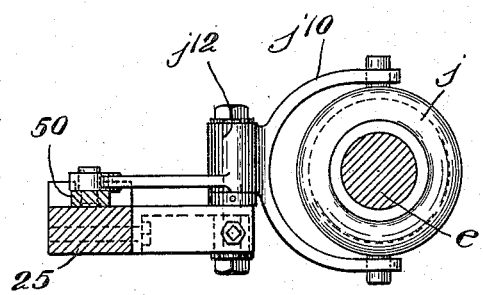

Figure 1 is a plan view of a reversing gearing having a clutch and a brake, and actuating - mechanism for the clutch and brake embodying this invention. Fig. 2 is a side elevation of the same. Fig. 3 is an enlarged vertical section of the brake-mechanism. Fig. 4 is a plan view of the same. Figs. 5 and 6 are details of the oscillatory actuating-means for the clutch and brake. Fig. 7 is a detail of the clutch lever.

The improved actuating - mechanism is here shown in connection with the reversing gearing of the aforesaid patent, yet it is adapted to other forms of reversing gearing involving the same general characteristics.

The reversing gearing here shown, comprises a driving-shaft $a$, and driven-shaft $e$, and intermediate gearing comprising a spur-gear $a'$ secured to the driving-shaft, pinions $b$ engaging said spur-gear, an internal gear $d$ secured to the driven-shaft $e$, and a pinion-carrier or case $f$ bearing the pinions $b$ and which incloses the internal gear. The clutch here shown for connecting one of the shafts with the other comprises a clutch-plate $g$, and an actuator therefor consisting of pivoted levers $i'$, on said clutch-plate $g$ having toes $i$ which engage an abutment $h^{20}$, on a fixed ring $h$, arranged on the hub of the internal-gear, and a sliding cone $j$ arranged on the driven-shaft $e$ which engages the ends of the levers $i'$, and a main clutch-lever $j^{10}$, pivoted at $j^{12}$, which engages the sliding cone and is adapted when moved to operate the clutch. The clutch-lever $j^{10}$ is adjustably supported, its pivots $j^{12}$ being mounted in a block which is adjustably held in a bracket by means of adjusting screws. Said clutch connects the pinion-carrier with the internal gear and hence with the driven-shaft, and the connection of said pinion-carrier with the driving-shaft is through or by means of the pinions and spur-gear, yet the particular connections employed are not material, so long as the clutch is arranged to connect the driven - shaft with the driving - shaft, whereby the driven-shaft is rotated forward in the same direction as the driving-shaft. Nor is the particular construction of the clutch material.

The brake here shown is similar in some respects to the brake of the aforesaid patent in that it comprises two semicircular members $o$, $o$, for engagement with the pinion-carrier $f$, said members having outwardly extended ends. Said members $o$, $o$, herein are attached together at one of their ends by a bolt, and said outwardly extended attached ends rest upon a stationary bar 20, which may be one of the supporting-bars for an engine. The opposite outwardly extended end 21 of the lower member $o$, rests on top of a stationary bar 25, which may be another supporting-bar for the engine, and the similarly formed end 22 of the upper member $o$, occupies a position above the end 21 of the lower member (see Fig. 3). Said end 22 is movable toward and from the end 21, thereby to cause the two brake-members to engage the pinion - carrier, said members having sufficient resiliency to admit of such movement. Such movement of the upper member is herein accomplished by means of an actuator, here shown as a sliding-bar 30, and termed the brake-bar, which is provided with a forward extension 31, and an inclined portion 32, at the junction of said extension and the main portion of the bar. The extension 31 is arranged between two rolls 35, 36. The roll 35 is arranged above the extension and is journaled in ears 37 rising from a base 38, set in a recess formed in the under side of the end portion 21 of the lower brake member, said ears being extended upwardly through a hole in the end of the upper brake-member. The roll 36 is arranged below the extension and is journaled in a bearing 40, here shown as a plate, placed in a recess formed in the top of the end of the upper brake-member and adjustably supported in different elevated positions by adjusting-screws. The journals of said roll occupy positions in vertical slots 41 in the upright ears 37, and movement of said roll up and down is thus permitted. Normally, the upper brake member is disengaged from the pinion-carrier, as represented in Fig. 3, and the roll 36 occupies a position with its journals at the upper ends of the slots 41, and the brake-bar 30 occupies a position with the forward part of its extension 31 between the rolls 35 and 36. When the brake-bar 30 is thrust forward, in the direction of the arrow, Fig. 3, its inclined portion engages the lower roll 36 and forces said roll and the end portion of the upper brake member downward, thereby to cause said member to frictionally engage the pinion-carrier. When the brake-bar 30 is moved in the opposite direction said upper brake-member will return to normal, as the pressure upon it is relieved.

This particular form of brake is of advantage as it admits of the employment of a sliding brake-bar or actuator 30, yet so far as my invention is concerned, other forms of brakes may be employed. Said brake, however, structurally speaking, forms one of the features of this invention.

To operate the brake the sliding brake-bar 30 is moved longitudinally.

The brake-bar 30 is mounted to slide in bearings provided for it on the stationary bar 25, and has, at one end, a downwardly extended pin 45, which enters a snail groove 46 in a disk 47, which is secured to an upright oscillatory shaft 48, supported by suitable bearings, and having secured to it a hand-wheel 49 for turning it. Said snail groove, however, as here shown, comprises two semicircular portions, arranged one in continuation of the other, one of short diameter, which is arranged concentric to the shaft 48, and the other of long diameter, which is arranged concentric to the end of the former and extends nearly to the edge of the disk.

The lower end of the pivoted clutch-lever $j^{10}$, is connected to a sliding bar 50, having its bearings on the stationary bar 25, and said sliding bar has at one end a pin 51, which is extended upwardly and enters a snail groove 52 in a disk 53, which is also secured to said oscillatory shaft 48. Said snail groove 52 is made similar to the aforesaid snail groove and comprises two semicircular portions arranged one in continuation of the other, one of short diameter concentric to the shaft 48, and the other of long diameter concentric to the end of the former, which extends nearly to the edge of the disk.

Normally both the clutch and the brake are disengaged, and in such case the cam grooved disks 47, 53, occupy the positions shown in Fig. 5, wherein it will be seen that both pins 45, 51, occupy positions in their respective grooves intermediate the length thereof and near the center of the disks. By turning the shaft 48 in a direction toward the right, Fig. 5, a half revolution, the parts will then occupy the position shown in Fig. 1, wherein it will be seen that the pin 45 has followed in its groove along the semicircular portion of short diameter until it has reached the end of the groove or thereabout, and, as said semicircular portion is concentric with the shaft 48 said pin 45 remains stationary during such movement of the disk, and the pin 51 has followed in its groove along the semicircular portion of long diameter until it has reached the end of the groove or thereabout, and, as said semicircular portion extends nearly to the edge of the disk said pin 51 will be moved in a direction radially to the axis of the shaft 48, and the sliding bar 50 will be moved to in turn move the clutch-lever to operate the clutch to engage the pinion-carrier. By turning the shaft 48 in a direction toward the left, Fig. 5, a half revolution, the parts will then occupy the positions shown in Fig. 6, wherein it will be seen that the pin 51 has followed in its groove along the semicircular portion of short diameter until it has reached the end of the groove or thereabout and, as said semicircular portion is concentric with the shaft 48 said pin 51 remains stationary during such movement, and the pin 45 has followed in its groove along the semicircular portion of long diameter until it has reached the end of the groove or thereabout, and, as said semicircular portion extends nearly to the edge of the disk said pin 45 will be moved in a direction radially to the axis of the shaft 48, and the brake-bar 30 will be moved to in turn move the brake-member and cause the brake to engage the pinion-carrier.

It will thus be seen that as the shaft 48 is oscillated the clutch and the brake are separately and independently operated, the connections between the shaft and the clutch permitting movement of the shaft in one direction to operate the brake without moving the clutch, and the connections between the shaft and the brake permitting movement of the shaft in one direction to operate the clutch without moving the brake; in other words, oscillatory movement of the shaft in one direction from normal operates the clutch, and in the other direction from normal operates the brake, each operation being separate and independent of the other.

I claim:—

1. In a reversing-gearing having a clutch-mechanism for forward drive, a brake-mechanism for reverse drive, and separate actuators therefor, the combination with an oscillatory shaft, means for connecting the actuators with the shaft whereby, when the shaft is oscillated in one direction, one actuator will be moved for operating the clutch-mechanism without moving the actuator of the brake-mechanism, and when the shaft is oscillated in its opposite direction, one actuator will move for operating the brake-mechanism without moving the actuator of the clutch-mechanism, substantially as described.

2. In an operating-mechanism for reversing-gearing, the combination with a brake-mechanism for reverse drive and a clutch-mechanism for forward drive, of rods operatively connected respectively with said brake-mechanism and clutch-mechanism, an oscillatory-shaft, means for connecting the rods with the shaft, and means for oscillating said shaft, whereby the rods will move radially from the shaft, for operating the clutch-mechanism and brake-mechanism independently, substantially as described.

3. In an actuating-mechanism for reversing-gearing, the combination of a brake-mechanism for reverse drive and a clutch-mechanism for forward drive, a support for said gearing, rods adapted to slide horizontally upon said support and having one of their ends connected respectively to the brake-mechanism and the clutch-mechanism, a vertical shaft supported upon said support, and cams carried by the said shaft for moving said bars independently, whereby the clutch-mechanism and brake-mechanism may be operated, substantially as described.

4. In an actuating-mechanism for reversing-gearing, the combination with a clutch-mechanism for forward drive and a brake-mechanism for reverse drive, sliding-bars connected to said brake-mechanism and clutch mechanism, a pair of horizontally arranged disks having grooves formed therein, means for connecting the slidable bars with the disks and means for oscillating said disks, whereby the bars may be moved independently for operating the clutch-mechanism and brake-mechanism, substantially as described.

5. In an actuating-mechanism for reversing-gearing, the combination of a clutch-mechanism for forward drive and a brake-mechanism for reverse drive, a clutch-lever operatively connected to the clutch-mechanism, a brake-bar operatively connected to the brake-mechanism, an oscillatory-shaft, a pair of spaced horizontally arranged disks mounted upon said shaft, said disks having grooves formed therein and each groove having a concentric and an eccentric portion, a slidable bar connected with the clutch-lever, the said bars having pins formed on one end thereof and slidable within said grooves, means for oscillating said shaft, whereby the pin of one bar will travel on the eccentric portion of one groove for moving said bar, and the pin carried by the other said bar adapted to travel on the concentric portion of one of the grooves whereby said bar will remain idle, substantially as, and for the purpose specified.

6. In an actuating-mechanism for reversing-gearing, having a clutch-mechanism for forward drive, and a brake-mechanism for reverse drive, a brake-bar connected to the brake-mechanism, a clutch-lever connected to the clutch-mechanism, an oscillatory shaft, a pair of disks mounted in longitudinal spaced relation on the shaft, a pin extending laterally from the terminal of both the bar and lever, and a groove in each of said disks for receiving one of the pins, whereby one disk controls the movement of the bar, and the other disk controls the movement of the lever.

7. In an actuating-mechanism for reversing-gearing, having a clutch-mechanism for forward drive, and a brake-mechanism for reverse drive, a brake-bar connected to the brake-mechanism, a clutch-lever connected to the clutch-mechanism, an oscillatory shaft, a pair of disks mounted in longitudinal spaced relation on the shaft, a pin extending laterally from the terminal of both the bar and lever, and a groove in each of said disks for receiving one of the pins, whereby one disk controls the movement of the bar, and the other disk controls the movement of the lever, the groove in each disk comprising two semicircular portions arranged one in continuation of the other, one being of short diameter and arranged concentric to the shaft, and the other of long diameter and arranged concentric to the end of the former.

8. In an actuating-mechanism for reversing-gearing, having a clutch-mechanism for forward drive, and a brake-mechanism for reverse drive, a brake-bar connected to the brake-mechanism, a clutch-lever connected to the clutch-mechanism, an oscillatory shaft, a pair of disks mounted in longitudinal spaced relation on the shaft, a pin extending laterally from the terminal of both the bar and the lever, and a groove in each of said disks for receiving one of the pins, whereby one disk controls the movement of the bar, and the other disk controls the movement of the lever, the groove in each disk comprising two semicircular portions arranged one in continuation of the other, one being of short diameter and arranged concentric to the shaft, and the other of long diameter and arranged concentric to the end of the former, and eccentric to the shaft, and extended nearly to the edge of the disk.

9. In an actuating-mechanism for reversing-gearing, having a clutch-mechanism for forward drive, and a brake-mechanism for reverse drive, a brake-bar connected to the brake-mechanism, a clutch-lever connected to the clutch-mechanism, an oscillatory shaft, a pair of disks mounted in longitudinal spaced relation on the shaft, a pin extending laterally from the terminal of both the bar and lever, and a groove in each of said disks for receiving one of the pins, whereby one disk controls the movement of the bar, and the other disk controls the movement of the lever, the groove in each disk comprising two semicircular portions arranged one in continuation of the other, one being of short diameter and arranged concentric to the shaft, and the other of long diameter and arranged concentric to the end of the former, and eccentric to the shaft, and extended nearly to the edge of the disk, said pins being non-responsive to the oscillation of the disks, while located in the portion of the short diameter, but being radially movable with respect to the shaft when engaged in the portion thereof of the long diameter.

In testimony whereof, I have signed my name to this specification, in the presence of two subscribing witnesses.

HENRY A. TUTTLE.

Witnesses:
H. B. DAVIS,
C. DOYLE.

Copies of this patent may be obtained for five cents each, by addressing the "Commissioner of Patents Washington, D. C."